United States Patent
Yanagiura et al.

(10) Patent No.: US 11,807,113 B2
(45) Date of Patent: Nov. 7, 2023

(54) FUEL CELL VEHICLE HAVING HYDROGEN DETECTION IN FUEL CELL ACCOMMODATION SPACE BELOW FRONT CABIN

(71) Applicant: HONDA MOTOR CO., LTD., Tokyo (JP)

(72) Inventors: Takashi Yanagiura, Tokyo (JP); Yuki Oshitani, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 92 days.

(21) Appl. No.: 17/513,222

(22) Filed: Oct. 28, 2021

(65) Prior Publication Data

US 2022/0134891 A1 May 5, 2022

(30) Foreign Application Priority Data

Oct. 30, 2020 (JP) ................. 2020-183091

(51) Int. Cl.
*B60K 1/04* (2019.01)
*B60L 50/71* (2019.01)
(Continued)

(52) U.S. Cl.
CPC ............. *B60L 50/71* (2019.02); *B60K 1/00* (2013.01); *B60K 1/04* (2013.01); *B60K 13/04* (2013.01);
(Continued)

(58) Field of Classification Search
CPC ........... B60L 50/71; B60K 1/04; B60K 13/04; B60K 15/07; B60K 2015/03315;
(Continued)

(56) References Cited

U.S. PATENT DOCUMENTS

2005/0155405 A1* 7/2005 Sasaki ............... H01M 8/04089
73/1.06
2009/0095051 A1 4/2009 Suzuki et al.
(Continued)

FOREIGN PATENT DOCUMENTS

JP H08-177641 A 7/1996
JP 2003-182378 A 7/2003
(Continued)

OTHER PUBLICATIONS

Jun. 28, 2022, Japanese Office Action issued for related JP Application No. 2020-183091.

*Primary Examiner* — James A English
*Assistant Examiner* — James J Triggs
(74) *Attorney, Agent, or Firm* — Paratus Law Group, PLLC (57) ABSTRACT

A fuel cell vehicle includes a cabin arranged at a vehicle front portion and provided with a seat therein where an occupant is seated, a fuel cell mounted below the cabin, and an accommodation space formed below the cabin and accommodating the fuel cell. An upper side of the accommodation space is covered with a ceiling surface formed by a bottom portion of the cabin, and a rear side of the accommodation space is opened. The ceiling surface is provided with a detector configured to detect a hydrogen concentration in the accommodation space.

7 Claims, 6 Drawing Sheets

(51) Int. Cl.
    *H01M 8/04082* (2016.01)
    *H01M 8/0444* (2016.01)
    *H01M 8/0432* (2016.01)
    *H01M 8/04746* (2016.01)
    *H01M 16/00* (2006.01)
    *B60K 15/07* (2006.01)
    *B60K 13/04* (2006.01)
    *B60K 1/00* (2006.01)
    *B60K 15/03* (2006.01)

(52) U.S. Cl.
    CPC ........... *B60K 15/07* (2013.01); *H01M 8/0444* (2013.01); *H01M 8/04201* (2013.01); *H01M 8/04373* (2013.01); *H01M 8/04776* (2013.01); *H01M 16/006* (2013.01); *B60K 2015/03315* (2013.01); *H01M 2220/20* (2013.01); *H01M 2250/20* (2013.01)

(58) Field of Classification Search
    CPC ......... H01M 8/04201; H01M 8/04373; H01M 8/0444; H01M 16/006; H01M 2220/20; H01M 2250/20
    See application file for complete search history.

(56) References Cited

U.S. PATENT DOCUMENTS

| | | | |
|---|---|---|---|
| 2009/0317692 A1 | 12/2009 | Matsumoto et al. | |
| 2010/0233562 A1* | 9/2010 | Kajiwara | G01M 3/007 |
| | | | 429/444 |
| 2015/0270562 A1* | 9/2015 | Naito | H01M 8/2457 |
| | | | 429/456 |
| 2016/0133954 A1* | 5/2016 | Nishiumi | B60L 50/71 |
| | | | 429/508 |
| 2018/0354558 A1* | 12/2018 | Otsura | B60K 13/04 |

FOREIGN PATENT DOCUMENTS

| | | |
|---|---|---|
| JP | 2008-100584 A | 5/2008 |
| JP | 2008-260483 A | 10/2008 |
| JP | 2010-004649 A | 1/2010 |
| JP | 2010-040330 A | 2/2010 |
| JP | 2010-231923 A | 10/2010 |
| JP | 2010-254174 A | 11/2010 |
| JP | 2013-230725 A | 11/2013 |
| JP | 2017-128202 A | 7/2017 |

\* cited by examiner

FUEL CELL VEHICLE HAVING HYDROGEN DETECTION IN FUEL CELL ACCOMMODATION SPACE BELOW FRONT CABIN

CROSS REFERENCE TO RELATED APPLICATIONS

This application claims priority to Japanese Patent Application No. 2020-183091 filed on Oct. 30, 2020, the content of which is incorporated herein by reference.

TECHNICAL FIELD

The present invention relates to a fuel cell vehicle equipped with a drive motor and a fuel cell.

BACKGROUND ART

In related art, a vehicle including a drive motor and a fuel cell (hereinafter referred to as a "fuel cell vehicle") has been known. In the fuel cell vehicle, $H_2$ gas (hereinafter, referred to as "hydrogen") that serves as fuel and $O_2$ gas (hereinafter, referred to as "oxygen") in air that serves as an oxidant are supplied to the fuel cell, and power generated when hydrogen and oxygen react with each other and generate water (water vapor) is extracted to outside and used as power for driving the drive motor. Fuel cell vehicles discharge only water vapor during traveling and do not discharge air pollutants, such as nitrogen oxides ($NO_x$) and sulfur oxides ($SO_x$), and carbon dioxide ($CO_2$) which is a cause of global warming. As a result, fuel cell vehicles are expected to become widespread as environmentally friendly vehicles not only for passenger cars but also for commercial vehicles such as trucks.

On the other hand, since hydrogen, which is the fuel of the fuel cell, is the lightest gas and is very susceptible to combustion and explosion, early detection at the time of leakage of hydrogen, prevention of staying and quick discharge of leaking hydrogen are required in the fuel cell vehicle as essential measures in addition to measures for preventing leakage of hydrogen.

For example, JP H8-177641 A describes a commercial vehicle such as a truck or a bus that supplies natural gas compressively filled in a tank to an engine as fuel. Like hydrogen, natural gas is also very susceptible to combustion and explosion. However, Patent Literature 1 describes a check valve that prevents backflow leakage of natural gas, while does not describe any specific safety measure in case of natural gas leakage.

An aspect of the present invention provides a fuel cell vehicle with improved safety against hydrogen leakage.

SUMMARY OF INVENTION

A fuel cell vehicle according to an aspect of the present invention includes a cabin arranged at a vehicle front portion and provided with a seat therein where an occupant is seated, a fuel cell mourned below the cabin, and an accommodation space formed below the cabin and accommodating the fuel cell. An upper side of the accommodation space is covered with a ceiling surface formed by a bottom portion of the cabin, and a rear side of the accommodation space is opened. The ceiling surface is provided with a detector configured to detect a hydrogen concentration in the accommodation space.

DESCRIPTION OF EMBODIMENTS

Hereinafter, an embodiment of a fuel cell vehicle according to the present invention will be described in detail with reference to the accompanying drawings. The drawings are viewed in directions of reference numerals. In the following description, a front-rear direction, a left-right direction, and an up-down direction are described in accordance with directions viewed from a driver of a vehicle. In the drawings, a front side of the vehicle is denoted by Fr, a rear side thereof is denoted by Rr, a right side thereof is denoted by R, a left side thereof is denoted by L, an upper side thereof is denoted by U, and a lower side thereof is denoted by D.

[Fuel Cell Vehicle]

Figure 1:
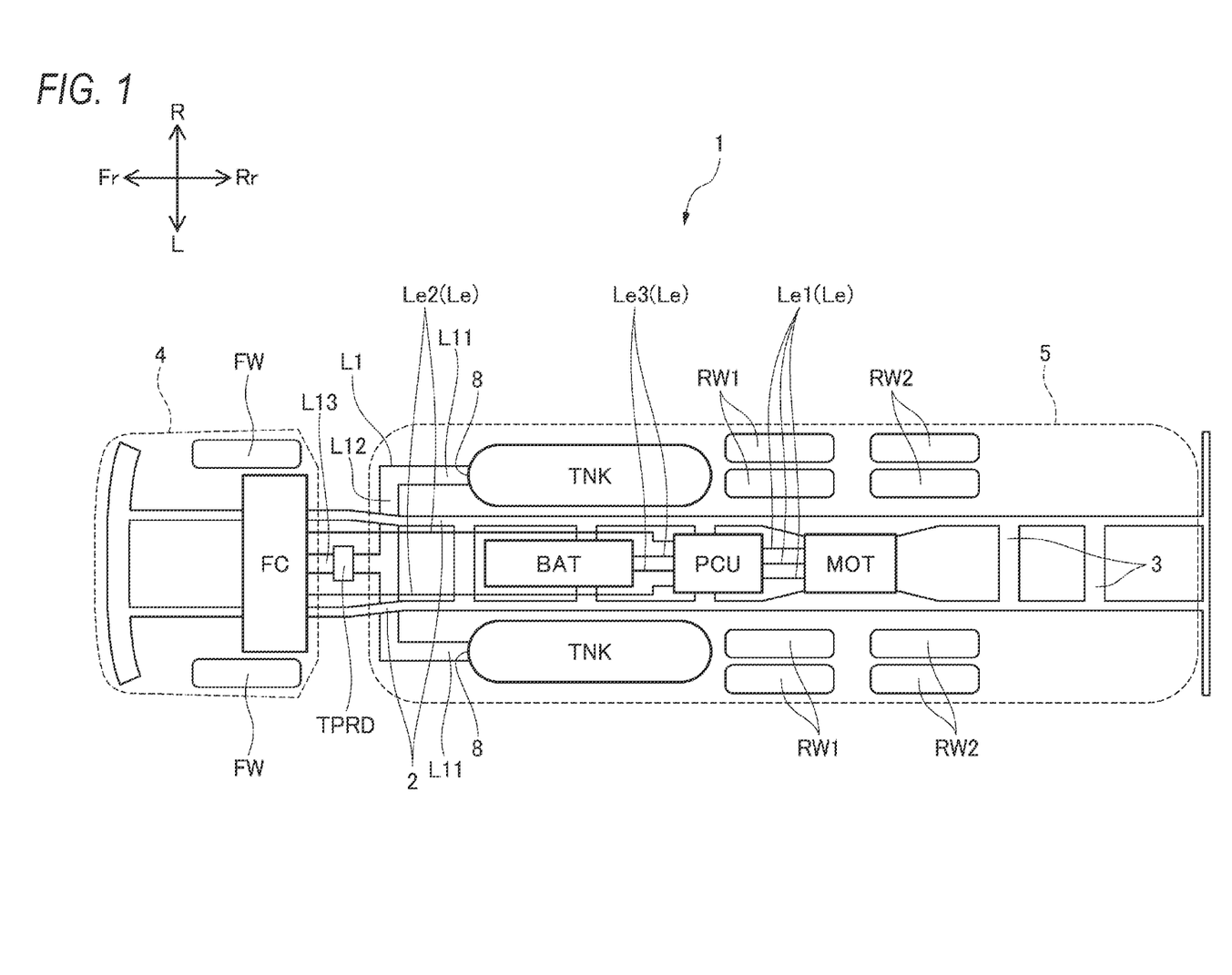
FIG. 1 is a schematic top view showing a fuel cell vehicle according to an embodiment of the present invention.
Figure 2:
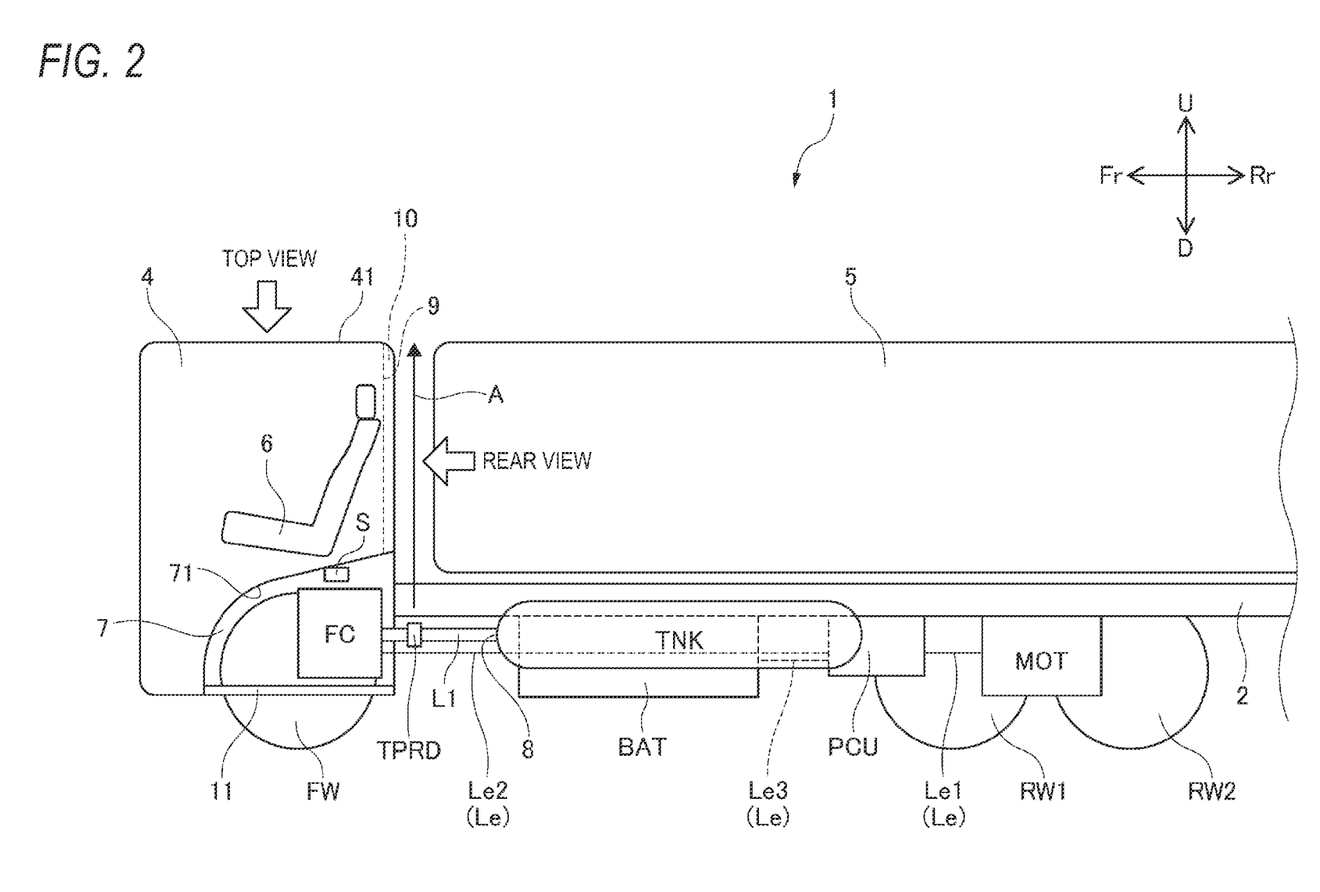
FIG. 2 is a schematic side view of the fuel cell vehicle shown in FIG. 1.

As shown in FIGS. 1 and 2, a fuel cell vehicle 1 includes a vehicle body that has a frame structure formed in a ladder shape by a pair of left and right side members 2 extending in the front-rear direction and a plurality of cross members 3 extending in a vehicle width direction between the left and right side members 2 and connecting the left and right side members 2. A cabin 4, in which a seat 6 where an occupant is seated is provided, is provided above front end portions of the pair of left and right side members 2. The cabin 4 is arranged at a front portion of the fuel cell vehicle 1. A deck portion 5 is provided above the left and right side members 2 behind the cabin 4. A pair of left and right front wheels FW are provided below the cabin 4. A pair of left and right rear front wheels RW1 and a pair of left and right rear rear wheels RW2 are provided behind the front wheels FW. The rear front wheels RW1 includes two wheels on each of left and right sides, and the rear rear wheels RW2 includes two wheels on each of the left and right sides behind the rear front wheels RW1. The rear front wheels RW1 and the rear rear wheels RW2 are provided on outer sides of the pair of left and right side members 2 in the vehicle width direction.

A fuel cell FC is mounted below the cabin 4. A hydrogen tank TNK in which hydrogen to be supplied to the fuel cell FC is compressively filled is provided below the deck portion 5 on each outer side of the pair of left and right side members 2 in the vehicle width direction. One hydrogen tank TNK is provided on each outer side of the pair of left and right side members 2.

The fuel cell FC is, for example, a fuel cell stack having a single cell of a solid polymer fuel cell in which an ion exchange membrane (proton exchange membrane) is sandwiched between a pair of electrodes including a fuel electrode (anode) and an oxygen electrode (cathode), and having a structure in which several hundreds of the single cells are stacked and connected in series via a separator (bipolar plate). A catalyst made of platinum (Pt) or the like is provided in a layer shape in the vicinity of an interface between each electrode and the ion exchange membrane, and hydrogen supplied to the fuel electrode is decomposed into electrons and hydrogen ions (protons) due to action of the catalyst. The electrons are extracted to an external circuit connected to the fuel electrode, while the hydrogen ions pass through the ion exchange membrane and reach the oxygen electrode. At the oxygen electrode, the hydrogen ions, oxygen in air, and the electrons reaching through the external circuit are combined due to the action of the catalyst to generate water, and a flow of the electrons extracted to the external circuit during such a series of processes is used as generated power.

The left and right hydrogen tanks TNK are fixed to the left and right side members 2 via tank support members (not shown), respectively. Each hydrogen tank TNK integrally includes a cylindrical tank body portion, a hemispherical tank front end portion that closes a front end of the tank body portion, and a hemispherical tank rear end portion that closes a rear end of the tank body portion. A filling and discharging hole 8 configured to fill and discharge hydrogen is provided in the vicinity of a center of the tank front end portion.

The fuel cell vehicle 1 includes a hydrogen pipe L1 that connects the fuel cell FC and the filling and discharging holes 8 of the left and right hydrogen tanks TNK.

The hydrogen pipe L1 includes: a pair of left and right first pipe portions L11 that extend in the front-rear direction along the side members 2 on two outer sides of the side members 2 in the vehicle width direction and are connected to the filling and discharging holes 8 of the left and right hydrogen tanks TNK; a second pipe portion L12 that connects front end portions of the pair of left and right first pipe portions L11 and extends in the vehicle width direction; and a third pipe portion L13 that connects the second pipe portion L12 and the fuel cell FC and extends in the front-rear direction. At the third pipe portion L13, a temperature activated pressure relief device (TPRD) is provided between the cabin 4 and the deck portion 5 in the front-rear direction.

The hydrogen tank TNK is compressively filled with hydrogen at a high pressure of, for example, about 70 MPa (about 700 atm). Therefore, when temperature in the hydrogen tank TNK rises due to an influence of external environment or the like, there is a risk that the compressively filled hydrogen may expand and broke the hydrogen tank TNK. The temperature activated pressure relief device TPRD is a device configured to operate when the temperature in the hydrogen tank TNK reaches a predetermined temperature so as to safely release a part of the hydrogen compressively filled in the hydrogen tank TNK into the atmosphere, thereby preventing the hydrogen tank TNK from being broken.

The hydrogen tank TNK can be filled with hydrogen, for example, by fitting a filling nozzle that is attached to a hose tip end of a hydrogen dispenser provided at a hydrogen station to a hydrogen filling inlet (not shown) that is connected to the filling and discharging hole of the hydrogen tank TNK via a pipe (not shown), and then supplying compressed hydrogen from the hydrogen dispenser to the hydrogen tank TNK.

A drive motor MOT, a secondary battery BAT, and a control unit PCU are mounted between the pair of left and right side members 2 below the deck portion 5. The drive motor MOT is a motor that drives at least one of the pairs of left and right rear front wheels RW1 and rear rear wheels RW2. The secondary battery BAT is a rechargeable storage battery such as a lithium ion battery, a nickel-metal hydride battery, or a capacitor. The control unit PCU is a device that is capable of converting DC power into AC power and AC power into DC power. The control unit PCU controls charging and discharging of the secondary battery BAT and input and output power of the drive motor MOT depending on a traveling state of the fuel cell vehicle 1.

The secondary battery BAT and the control unit PCU are arranged in front of the drive motor MOT. Although the control unit PCU is arranged between the secondary battery BAT and the drive motor MOT in the front-rear direction in the present embodiment, a positional relationship between the secondary battery BAT and the control unit PCU is set as desired. For example, the secondary battery BAT and the control unit PCU may be arranged separately, or the secondary battery BAT and the control unit PCU may be arranged as an intelligent power unit (IPU) housed in one housing.

The fuel cell FC, the drive motor MOT, the secondary battery BAT, and the control unit PCU are electrically connected by a power line Le. The power line Le includes a three-phase AC first power line Le1 that electrically connects the drive motor MOT and the control unit PCU, a DC second power line Le2 that electrically connects the fuel cell FC and the control unit PCU, and a DC third power line Le3 that electrically connects the secondary battery BAT and the control unit PCU. The power line Le including the first power line Le1, the second power line Le2, and the third power line Le3 is arranged between the pair of left and right side members 2 in the vehicle width direction.

In the fuel cell vehicle 1, the fuel cell FC is used as a generator that generates power for driving the drive motor MOT. Hydrogen that serves as fuel is supplied from the hydrogen tank TNK to the fuel cell FC through the hydrogen pipe L1, and oxygen in air is supplied to the fuel cell FC as an oxidant so as to generate DC power by the fuel cell FC. The DC power generated by the fuel cell FC is boosted by a boost converter (not shown) as necessary, and then flows to the control unit PCU through the second power line Le2, and is distributed depending on the traveling state of the fuel cell vehicle 1 into power that is converted into three-phase AC power and supplied from the control unit PCU to the drive motor MOT through the first power line Le1, and power charged from the control unit PCU into the secondary battery BAT through the third power line Le3. Depending on the traveling state of the fuel cell vehicle 1, all of the DC power generated by the fuel cell FC may be supplied to the drive motor MOT through the first power line Le1, or may be charged from the control unit PCU into the secondary battery BAT through the third power line Le3.

In the fuel cell vehicle 1, the secondary battery BAT is used as a storage battery that stores power for driving the drive motor MOT. For example, when larger power is required as compared with power during normal traveling, such as when the fuel cell vehicle 1 starts or accelerates, power can be discharged from the secondary battery BAT to the control unit PCU through the third power line Le3, the DC power generated by the fuel cell FC and the power discharged from the secondary battery BAT can be superimposed, converted in the control unit PCU into three-phase AC power, and supplied to the drive motor MOT through the first power line Le1. For example, when power is not generated by the fuel cell FC or when power cannot be generated by the fuel cell FC, such as when the fuel cell FC actuates or fails, or when hydrogen serving as the fuel is exhausted, power necessary for traveling of the fuel cell vehicle 1 can be discharged from the secondary battery BAT to the control unit PCU through the third power line Le3, converted into three-phase AC power in the control unit PCU, and supplied to the drive motor MOT through the first power line Le1.

As a method of charging the secondary battery BAT, in addition to the method of charging the DC power generated by the fuel cell FC as described above, a charging inlet (not shown) capable of receiving power from an external power supply and a power line (not shown) that electrically connects the charging inlet and the secondary battery BAT or the control unit PCU may be provided in the fuel cell vehicle 1, and a method of charging power from the external power supply via the charging inlet may be possible.

The drive motor MOT can function as a generator that generates three-phase AC regenerative power during braking of the fuel cell vehicle 1. The three-phase AC regenerative power generated by the drive motor MOT flows to the control unit PCU through the first power line Le1, is converted into DC power in the control unit PCU and is charged to the secondary battery BAT through the third power line Le3.

[Measure Against Hydrogen Leakage in Fuel Cell Vehicle]

Next, measures against hydrogen leakage in the fuel cell vehicle 1 will be described with reference to FIGS. 2 to 4.

As shown in FIG. 2, an accommodation space 7 in which the fuel cell FC is accommodated is formed below the cabin 4 of the fuel cell vehicle 1. An interior of the cabin 4 and the accommodation space 7 are partitioned such that hydrogen does not flow therebetween. An upper side of the accommodation space 7 is covered by a ceiling surface 71 formed by a bottom portion of the cabin 4, and a rear side thereof is opened. A hydrogen sensor S configured to detect a hydrogen concentration is provided on the ceiling surface 71 of the accommodation space 7.

Since hydrogen is the lightest and easily diffused gas, when hydrogen leakage occurs in the fuel cell FC, hydrogen leaking from the fuel cell FC rapidly moves to the ceiling surface 71 of the accommodation space 7. Since the hydrogen sensor S is provided on the ceiling surface 71 of the accommodation space 7, the hydrogen leaking from the fuel cell FC can be detected by the hydrogen sensor S at an early stage. As a result, when hydrogen leakage occurs in the fuel cell FC, the hydrogen leakage can be detected at an early stage. Therefore, necessary safety measures can be taken promptly, including blocking of hydrogen supply and identifying of a location where hydrogen leaks, and thus safety against hydrogen leakage is improved.

The ceiling surface 71 is upwardly inclined from a front side toward a rear side in a side view. Therefore, when hydrogen leakage occurs in the fuel cell FC, hydrogen leaking from the fuel cell FC moves to the ceiling surface 71 of the accommodation space 7 and then moves to the rear side, which is located at an upper side, along the ceiling surface 71. Since the rear side of the accommodation space 7 is opened, the hydrogen leaking from the fuel cell FC moves to the rear side along the ceiling surface 71 and is discharged to outside of the accommodation space 7.

As a result, even when hydrogen leakage occurs in the fuel cell FC, hydrogen leaking from the fuel cell FC moves to the rear side along the ceiling surface 71 and is discharged to the outside of the accommodation space 7, so that the hydrogen leaking from the fuel cell FC can be prevented from staying in the accommodation space 7.

Figure 3:
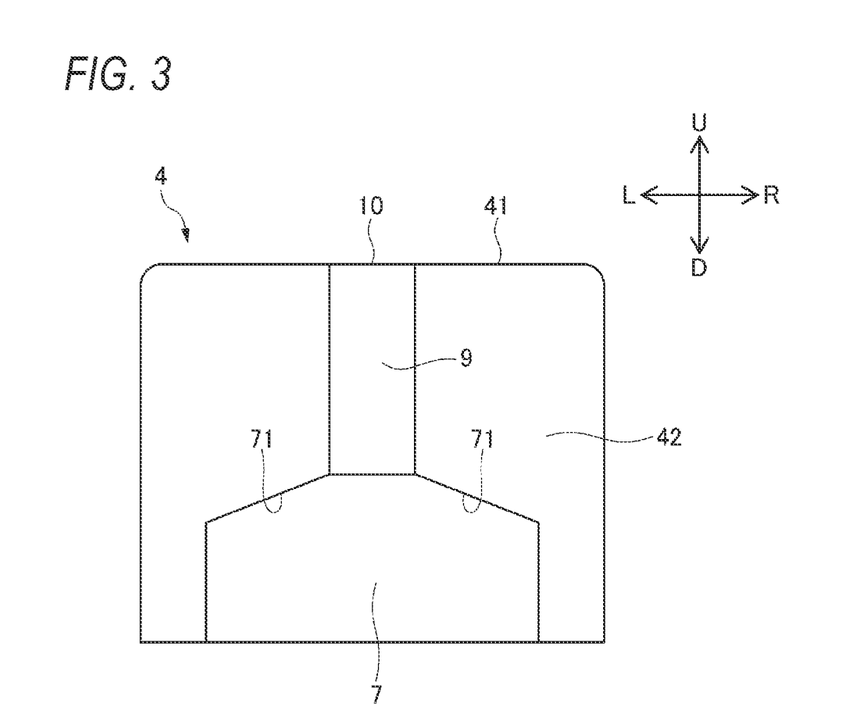
FIG. 3 is a rear view of a rear surface of a cabin of the fuel cell vehicle shown in FIG. 1.
Figure 4:
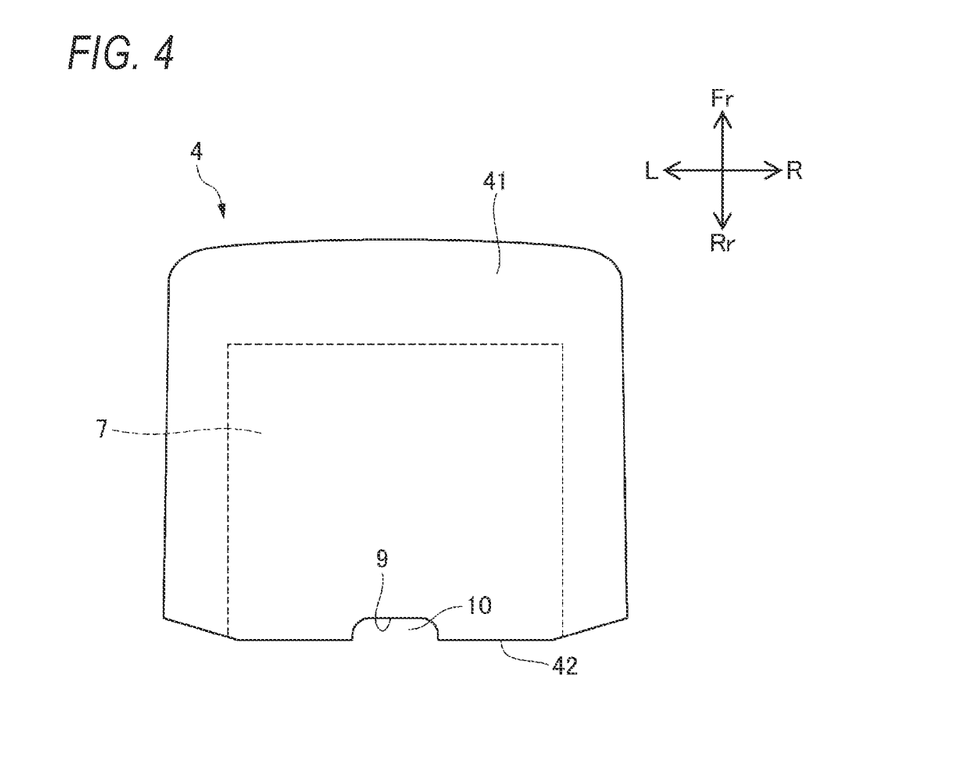
FIG. 4 is a top view of an upper surface of the cabin of the fuel cell vehicle shown in FIG. 1.

As shown in FIGS. 3 and 4, the ceiling surface 71 is upwardly inclined toward a center in the vehicle width direction in a rear view. Therefore, when hydrogen leakage occurs in the fuel cell FC, hydrogen leaking from the fuel cell FC moves to the ceiling surface 71 of the accommodation space 7 and then moves to the center in the vehicle width direction, which is located at an upper side, along the ceiling surface 71.

As a result, the hydrogen leaking from the fuel cell FC is rapidly concentrated at the center portion of the ceiling surface 71 in the vehicle width direction, so that the hydrogen leakage can be detected at an early stage by arranging the hydrogen sensor S in the vicinity of the center portion of the ceiling surface 71, even if an amount of the hydrogen leaking from the fuel cell FC is very small.

A rear surface 42 of the cabin 4 is formed with an exhaust portion 10 that is opened upward in an upper surface 41 of the cabin 4, and a communication passage (hydrogen guide portion) 9 that communicates with the accommodation space 7 and the exhaust portion 10. The communication passage 9 extends upward from the ceiling surface 71 of the accommodation space 7 and is connected to the exhaust portion 10.

In the present embodiment, the exhaust portion 10 and the communication passage 9 are forwardly recessed portions that are formed in the rear surface 42 of the cabin 4.

Therefore, when hydrogen leakage occurs in the fuel cell FC, hydrogen leaking from the fuel cell FC moves to the ceiling surface 71 of the accommodation space 7 and then is discharged through the communication passage 9 from the exhaust portion 10 into the atmosphere outside the fuel cell vehicle 1. As a result, the hydrogen leaking from the fuel cell FC can be prevented from staying in the accommodation space 7.

Further, since the exhaust portion 10 and the communication passage 9 are forwardly recessed portions that are formed in the rear surface 42 of the cabin 4, the exhaust portion 10 that is opened upward from the upper surface 41 of the cabin 4 and the communication passage 9 that communicates with the accommodation space 7 and the exhaust portion 10 can be easily formed without forming any through hole that penetrates the cabin 4.

In the present embodiment, the ceiling surface 71 is upwardly inclined from the front side toward the rear side in a side view, and is upwardly inclined toward the center in the vehicle width direction in a rear view. The communication passage 9 is formed in the rear surface 42 of the cabin 4 and extends upward from the center of the ceiling surface 71 in the vehicle width direction. In other words, the ceiling surface 71 is upwardly inclined toward the communication passage 9.

Therefore, when hydrogen leakage occurs in the fuel cell FC, hydrogen leaking from the fuel cell FC moves to the ceiling surface 71 of the accommodation space 7 and then moves along the ceiling surface 71 toward a connection portion between the accommodation space 7 and the communication passage 9. Then the hydrogen leaking from the fuel cell FC passes through the communication passage 9 from the ceiling surface 71 of the accommodation space 7 and is discharged from the exhaust portion 10 to the atmosphere outside the fuel cell vehicle 1. As a result, the hydrogen leaking from the fuel cell FC can be further prevented from staying in the accommodation space 7.

The exhaust portion 10 and the communication passage 9 may not be the forwardly recessed portions that are formed in the rear surface 42 of the cabin 4.

Figure 5:
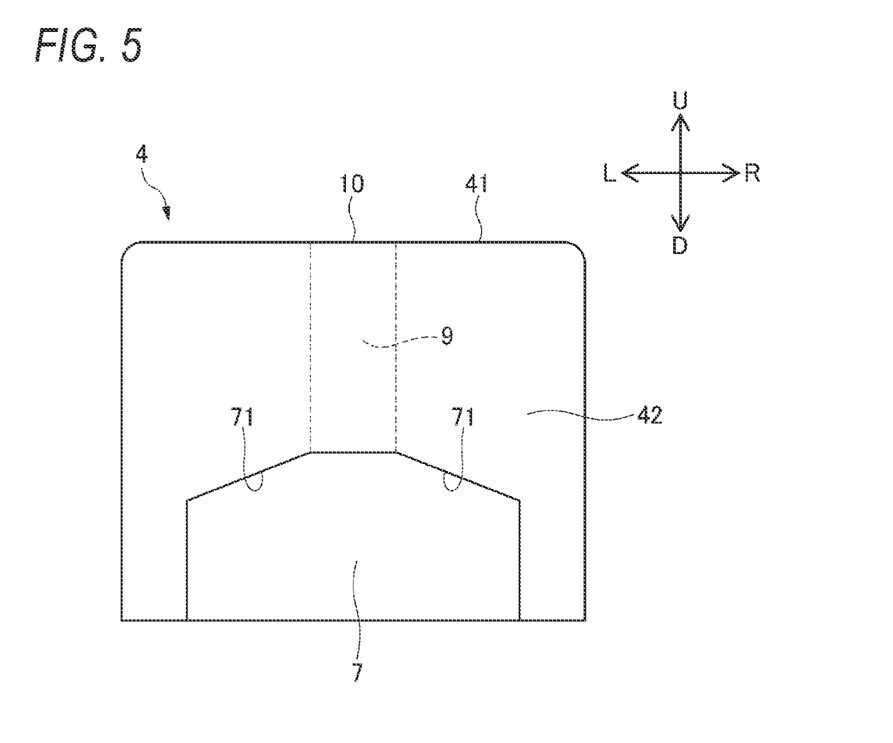
FIG. 5 is a rear view of the rear surface of the cabin showing a modification of a communication passage and an exhaust portion of the fuel cell vehicle shown in FIG. 1.
Figure 6:
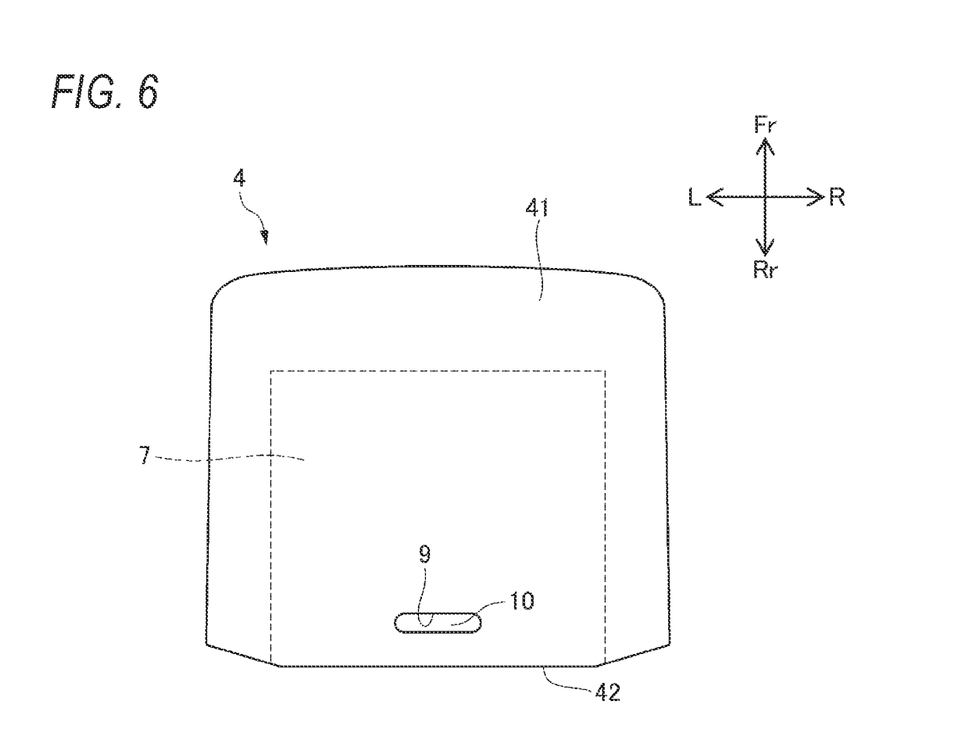
FIG. 6 is a top view of the upper surface of the cabin showing the modification of the communication passage and the exhaust portion of the fuel cell vehicle shown in FIG. 1.

For example, as shown in FIGS. 5 and 6, the communication passage 9 may be a through hole that penetrates the ceiling surface 71 of the accommodation space 7 and the upper surface 41 of the cabin 4 and extends in the up-down direction, and the exhaust portion 10 may be a vent opening that is opened upward in the upper surface 41 of the cabin 4 at an upper end portion of the communication passage 9.

Referring back to FIG. 2, the fuel cell vehicle 1 further includes an under cover 11 that faces the ceiling surface 71 of the accommodation space 7 in the up-down direction and covers a lower side of the fuel cell FC. A lower side of the accommodation space 7 is covered with the under cover 11.

As a result, since the lower side of the fuel cell FC is covered by the under cover 11, the fuel cell FC can be protected from flying objects such as small stones from a lower side such as the ground during traveling of the fuel cell vehicle 1.

Further, since the upper side of the accommodation space 7 is covered with the ceiling surface 71 while the lower side thereof is covered with the under cover 11, foreign matters such as dust and muddy water can be prevented from entering the accommodation space 7, and the accommodation space 7 is hardly affected by outside air. Therefore, a decrease in detection accuracy of the hydrogen sensor S caused by foreign matter such as dust or muddy water can be prevented, and a decrease in the detection accuracy of the hydrogen sensor S caused by an influence of outside air can also be prevented. As a result, when hydrogen leakage occurs in the fuel cell FC, the hydrogen sensor S can more reliably detect the hydrogen leakage.

In the present embodiment, as described above, the temperature activated pressure relief device TPRD provided at the second pipe portion L12 of the hydrogen pipe L1 is arranged between the cabin 4 and the deck portion 5 in the front-rear direction.

Therefore, even when the temperature activated pressure relief device TPRD is operated and hydrogen is released from the hydrogen tank TNK, the released hydrogen passes between the cabin 4 and the deck portion 5 and is discharged into the atmosphere above the fuel cell vehicle 1, as indicated by an arrow A in FIG. 2. As a result, the hydrogen released from the hydrogen tank TNK due to the operation of the temperature activated pressure relief device TPRD can be prevented from staying below the accommodation space 7 and the deck portion 5. Further, since the hydrogen released from the hydrogen tank TNK due to the operation of the temperature activated pressure relief device TPRD can be prevented from flowing into the accommodation space 7, the hydrogen sensor S provided on the ceiling surface 71 of the accommodation space 7 can be prevented from detecting the hydrogen released from the hydrogen tank TNK due to the operation of the temperature activated pressure relief device TPRD. As a result, the hydrogen sensor S provided on the ceiling surface 71 of the accommodation space 7 can be prevented from erroneously detecting that hydrogen leakage has occurred in the fuel cell FC due to the hydrogen released from the hydrogen tank TNK due to the operation of the temperature activated pressure relief device TPRD.

When hydrogen leakage occurs in the fuel cell vehicle 1, the secondary battery BAT, the drive motor MOT, the control unit PCU, and the power line Le may each become an ignition point when coming into contact with leaking hydrogen. Therefore, the secondary battery BAT, the drive motor MOT, the control unit PCU, and the power line Le are preferably arranged so as not to come into contact with the leaking hydrogen when the hydrogen leakage occurs in the fuel cell vehicle 1.

In the present embodiment, the hydrogen pipe L1 is arranged above the power line Le and below the hydrogen sensor S in a side view. Therefore, when hydrogen leakage occurs in the hydrogen pipe L1, hydrogen leaking from the hydrogen pipe L1 diffuses upward. As a result, since the hydrogen leaking from the hydrogen pipe L1 can be prevented from coming into contact with the power line Le, even when the hydrogen leakage occurs in the hydrogen pipe L1, the hydrogen leaking from the hydrogen pipe L1 can be prevented from coming into contact with the power line Le and igniting. In addition, since the hydrogen pipe L1 is provided below the hydrogen sensor S in a side view, when the hydrogen leakage occurs in the hydrogen pipe L1, the hydrogen leaking from the hydrogen pipe L1 can be detected by the hydrogen sensor S.

Referring back to FIG. 1, the hydrogen tank TNK and the first pipe portion L11 of the hydrogen pipe L1 are arranged on outer sides of the pair of left and right side members 2 in the vehicle width direction. Meanwhile, the secondary battery BAT, the drive motor MOT, the control unit PCU, and the power line Le are arranged between the pair of left and right side members 2.

Therefore, even when the fuel cell vehicle 1 undergoes a side collision, the secondary battery BAT, the drive motor MOT, the control unit PCU, and the power line Le are protected by the pair of left and right side members 2, and thus damage to the secondary battery BAT, the drive motor MOT, the control unit KU, and the power line Le can be reduced. Further, since the hydrogen tank TNK and the first pipe portion L11 of the hydrogen pipe L1 collide with the pair of left and right side members 2, the hydrogen tank TNK and the first pipe portion L11 of the hydrogen pipe L1 can be prevented from entering between the pair of left and right side members 2. As a result, even when the fuel cell vehicle 1 undergoes the side collision, the secondary battery BAT, the drive motor MOT, the control unit PCU, and the power line Le can be prevented from being damaged and discharging to outside, the hydrogen tank TNK and the first pipe portion L11 of the hydrogen pipe L1 can be prevented from entering between the pair of left and right side members 2, and hydrogen leaking from the hydrogen tank TNK or the first pipe portion L11 of the hydrogen pipe L1 can be prevented from coming into contact with the secondary battery BAT, the drive motor MOT, the control unit PCU, and the power line Le, so that the hydrogen leaking from the hydrogen tank TNK or the first pipe portion L11 of the hydrogen pipe L1 can be prevented from coming into contact with the secondary battery BAT, the drive motor MOT, the control unit PCU, and the power line Le and igniting even when the fuel cell vehicle 1 undergoes the side collision.

Although one embodiment of the present invention has been described above with reference to the accompanying drawings, it is needless to say that the present invention is not limited to such an embodiment. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from a spirit of the invention.

For example, the number of the fuel cell FC mounted on the fuel cell vehicle 1 is not limited to one. A plurality of fuel cells FC may be accommodated in the accommodation space 7 according to required generated power. The number of the hydrogen tanks TNK mounted on the fuel cell vehicle 1 and arrangement locations thereof are not limited to the above embodiment. In the fuel cell vehicle 1, the number and arrangement locations of the hydrogen tanks can be appropriately set according to an amount of required hydrogen, a weight balance with other members, and the like, and a plurality of hydrogen tanks TNK having different capacities may be arranged on vehicle width direction outer sides or inner sides of the side members 2.

As for the temperature activated pressure relief device TPRD, for example, the temperature activated pressure relief device TPRD may be provided in each of the two left and right first pipe portions L11.

As for the hydrogen pipe L1, for example, the second pipe portion L12 and the third pipe portion L13 may not be provided, each of the two left and right first pipe portions L11 may extend to the front of the vehicle body and be connected to the fuel cell FC, and the two left and right first pipe portions L11 may each be provided with the temperature activated pressure relief device TPRD.

At least the following matters are described in the present specification. Although corresponding components or the like in the above embodiment are shown in parentheses as an example, the present disclosure is not limited thereto.

(1) A fuel cell vehicle (fuel cell vehicle 1) includes: a cabin (cabin 4) arranged at a vehicle front portion and provided with a seat (seat 6) therein where an occupant is seated;
  a fuel cell (fuel cell FC) mounted below the cabin; and
  an accommodation space (accommodation space 7) formed below the cabin and accommodating the fuel cell.

An upper side of the accommodation space is covered with a ceiling surface (ceiling surface 71) formed by a bottom portion of the cabin, and a rear side thereof is opened.

The ceiling surface is provided with a detector (hydrogen sensor S) configured to detect a hydrogen concentration in the accommodation space.

According to (1), since the detector configured to detect the hydrogen concentration is provided on the ceiling surface of the accommodation space, hydrogen leaking from the fuel cell can be detected at an early stage by the detector. As a result, when hydrogen leakage occurs in the fuel cell, the hydrogen leakage can be detected at an early stage. Therefore, necessary safety measures can be taken promptly, including blocking of hydrogen supply and identifying of a location where hydrogen leaks, and thus safety against hydrogen leakage is improved.

(2) The fuel cell vehicle according to (1), in which
  the ceiling surface is upwardly inclined from a front side toward the rear side in a side view.

According to (2), since the ceiling surface is upwardly inclined from the front side toward the rear side in a side view, even when hydrogen leakage occurs in the fuel cell, hydrogen leaking from the fuel cell moves to the rear side along the ceiling surface and is discharged to outside of the accommodation space. As a result, the hydrogen leaking from the fuel cell can be prevented from staying in the accommodation space 7.

(3) The fuel cell vehicle according to (1) or (2), in which
  the ceiling surface is upwardly inclined toward a center in a vehicle width direction in a rear view.

According to (3), since the ceiling surface is upwardly inclined toward the center in the vehicle width direction in a rear view, hydrogen leaking from the fuel cell is rapidly concentrated at the center portion of the ceiling surface. As a result, hydrogen leakage can be detected at an early stage by arranging the detector in the vicinity of the center portion of the ceiling surface, even if an amount of the hydrogen leaking from the fuel cell is very small.

(4) The fuel cell vehicle according to any one of (1) to (3) further includes:
  an exhaust portion (exhaust portion 10) that is opened upward in an upper surface (upper surface 41) of the cabin; and
  a communication passage (communication passage 9) that communicates with the accommodation space and the exhaust portion.

The communication passage extends upward from the ceiling surface and is connected to the exhaust portion.

According to (4), the fuel cell vehicle further includes the exhaust portion that is opened upward in the upper surface of the cabin, and the communication passage that communicates with the accommodation space and the exhaust portion, and the communication passage extends upward from the ceiling surface and is connected to the exhaust portion. Therefore, when hydrogen leakage occurs in the fuel cell, hydrogen leaking from the fuel cell moves to the ceiling surface of the accommodation space and then is discharged through the communication passage from the exhaust portion into the atmosphere outside the fuel cell vehicle. As a result, the hydrogen leaking from the fuel cell can be prevented from staying in the accommodation space 7.

(5) The fuel cell vehicle according to (4), in which
  the exhaust portion and the communication passage are forwardly recessed portions that are formed in a rear surface (rear surface 42) of the cabin.

According to (5), since the exhaust portion and the communication passage are forwardly recessed portions that are formed in the rear surface of the cabin, the exhaust portion and the communication passage can be easily formed without forming any through hole that penetrates the cabin.

(6) The fuel cell vehicle according to (4) or (5), in which
  the ceiling surface is upwardly inclined toward the communication passage.

According to (6), since the ceiling surface is upwardly inclined toward the communication passage, when hydrogen leakage occurs in the fuel cell, hydrogen leaking from the fuel cell moves to the ceiling surface of the accommodation space and then moves along the ceiling surface toward a connection portion between the accommodation space and the communication passage. Then the hydrogen leaking from the fuel cell passes through the communication passage from the ceiling surface of the accommodation space and is discharged from the exhaust portion to the atmosphere outside the fuel cell vehicle. As a result, the hydrogen leaking from the fuel cell can be further prevented from staying in the accommodation space 7.

(7) The fuel cell vehicle according to any one of (1) to (6) further includes:
  an under cover (under cover 11) that faces the ceiling surface in an up-down direction and covers a lower side of the fuel cell.

A lower side of the accommodation space is covered with the under cover.

According to (7), since the fuel cell vehicle further includes the under cover that faces the ceiling surface in the up-down direction and covers the lower side of the fuel cell, and the lower side of the fuel cell is covered by the under cover, so that the fuel cell can be protected from flying objects such as small stones from a lower side such as the ground during traveling of the fuel cell vehicle. Further, since the upper side of the accommodation space is covered with the ceiling surface while the lower side thereof is covered with the under cover, foreign matters such as dust and muddy water can be prevented from entering the accommodation space, and the accommodation space is hardly affected by outside air. Therefore, a decrease in detection accuracy of the detector caused by foreign matter such as dust or muddy water can be prevented, and a decrease in the detection accuracy of the detector caused by an influence of outside air can also be prevented. As a result, when hydrogen leakage occurs in the fuel cell, the detector can more reliably detect the hydrogen leakage.

(8) The fuel cell vehicle according to any one of (1) to (7) further includes:

a deck portion (deck portion 5) provided behind the cabin;
a hydrogen tank (hydrogen tank TNK) that is mounted below the deck portion and is compressively filled with hydrogen; and
a hydrogen pipe (hydrogen pipe L1) that connects the hydrogen tank and the fuel cell.

The hydrogen pipe is provided with a temperature activated pressure relief device (temperature activated pressure relief device TPRD), and the temperature activated pressure relief device is arranged between the cabin and the deck portion in a front-rear direction.

According to (8), since the temperature activated pressure relief device is arranged between the cabin and the deck portion in the front-rear direction, even when the temperature activated pressure relief device is operated and hydrogen is released from the hydrogen tank, the released hydrogen passes between the cabin and the deck portion and is discharged into the atmosphere above the fuel cell vehicle. As a result, the hydrogen released from the hydrogen tank due to the operation of the temperature activated pressure relief device can be prevented from staying below the accommodation space and the deck portion. Further, since the hydrogen released from the hydrogen tank due to the operation of the temperature activated pressure relief device can be prevented from flowing into the accommodation space, the detector provided on the ceiling surface of the accommodation space can be prevented from detecting the hydrogen released from the hydrogen tank due to the operation of the temperature activated pressure relief device. As a result, the detector provided on the ceiling surface of the accommodation space can be prevented from erroneously detecting that hydrogen leakage has occurred in the fuel cell due to the hydrogen released from the hydrogen tank due to the operation of the temperature activated pressure relief device.

(9) The fuel cell vehicle according to any one of (1) to (8) further includes:

a vehicle body that has a frame structure including a pair of left and right side members (side members 2) extending in the front-rear direction;
a hydrogen tank (hydrogen tank TNK) that is arranged behind the cabin and is compressively filled with hydrogen;
a hydrogen pipe (hydrogen pipe L1) that connects the hydrogen tank and the fuel cell;
a secondary battery (secondary battery BAT) arranged behind the cabin;
a drive motor (drive motor MOT) arranged behind the cabin; and
a power line (power line Le) that electrically connects the fuel cell, the secondary battery, and the drive motor.

The secondary battery, the drive motor, and the power line are arranged between the pair of left and right side members, the hydrogen tank is arranged on an outer side of the pair of left and right side members in a vehicle width direction, and the hydrogen pipe is provided above the power line and below the detector in a side view.

According to (9), since the hydrogen pipe is arranged above the power line in a side view, when hydrogen leakage occurs in the hydrogen pipe, hydrogen leaking from the hydrogen pipe diffuses upward. As a result, since the hydrogen leaking from the hydrogen pipe can be prevented from coming into contact with the power line, even when the hydrogen leakage occurs in the hydrogen pipe, the hydrogen leaking from the hydrogen pipe can be prevented from coming into contact with the power line and igniting. In addition, since the hydrogen pipe is provided below the detector in a side view, when the hydrogen leakage occurs in the hydrogen pipe, the hydrogen leaking from the hydrogen pipe can be detected by the detector.

Further, even when the fuel cell vehicle undergoes a side collision, the secondary battery, the drive motor, and the power line are protected by the pair of left and right side members, and thus damage to the secondary battery, the drive motor, the control unit, and the power line can be reduced. Further, since the hydrogen tank collides with the pair of left and right side members 2, the hydrogen tank can be prevented from entering between the pair of left and right side members. As a result, even when the fuel cell vehicle undergoes the side collision, the secondary battery, the drive motor, and the power line can be prevented from being damaged and discharging to outside, the hydrogen tank can be prevented from entering between the pair of left and right side members, and hydrogen leaking from the hydrogen tank can be prevented from coming into contact with the secondary battery, the drive motor, and the power line, so that the hydrogen leaking from the hydrogen tank can be prevented from coming into contact with the secondary battery, the drive motor, and the power line and igniting even when the fuel cell vehicle undergoes the side collision.

What is claimed is:

1. A fuel cell vehicle comprising:
a cabin arranged at a vehicle front portion and provided with a seat therein where an occupant is seated;
a fuel cell mounted below the cabin;
an accommodation space formed below the cabin and accommodating the fuel cell, wherein
an upper side of the accommodation space is covered with a ceiling surface formed by a bottom portion of the cabin, and a rear side of the accommodation space is opened to outside of the accommodation space to allow gas inside the accommodation space to be discharged, and
the ceiling surface is provided with a detector configured to detect a hydrogen concentration in the accommodation space;
an exhaust portion that is opened upward in an upper surface of the cabin to allow the gas to be discharged to outside of the vehicle through the exhaust portion; and
a communication passage that communicates with the accommodation space and the exhaust portion, wherein
the communication passage is connected to the exhaust portion and the ceiling surface is upwardly inclined from a front side toward the rear side in a side view such that the gas moves along the ceiling surface with the detector toward the rear side located in a higher position.

2. The fuel cell vehicle according to claim 1, wherein the ceiling surface is upwardly inclined toward a center in a vehicle width direction in a rear view such that the gas moves along the ceiling surface toward the center located in a higher position.

3. The fuel cell vehicle according to claim 1, wherein the exhaust portion and the communication passage are constituted of recessed portions formed in a rear surface of the cabin.

4. The fuel cell vehicle according to claim 1, wherein the ceiling surface is upwardly inclined toward a connection portion between the accommodation space and the communication passage such that the gas moves along the ceiling surface toward the connection portion in a higher position.

5. The fuel cell vehicle according to claim 1, further comprising:
an under cover that faces the ceiling surface in an up-down direction and covers a lower side of the fuel cell, wherein
a lower side of the accommodation space is covered with the under cover.

6. The fuel cell vehicle according to claim 1, further comprising:
a deck portion provided behind the cabin;
a hydrogen tank that is mounted below the deck portion and is compressively filled with hydrogen; and
a hydrogen pipe that connects the hydrogen tank and the fuel cell, wherein
the hydrogen pipe is provided with a temperature activated pressure relief device, and
the temperature activated pressure relief device is arranged between the cabin and the deck portion in a front-rear direction.

7. The fuel cell vehicle according to claim 1, further comprising:
a vehicle body that has a frame structure including a pair of left and right side members extending in a front-rear direction;
a hydrogen tank that is arranged behind the cabin and is compressively filled with hydrogen;
a hydrogen pipe that connects the hydrogen tank and the fuel cell;
a secondary battery arranged behind the cabin;
a drive motor arranged behind the cabin; and
a power line that electrically connects the fuel cell, the secondary battery, and the drive motor, wherein
the secondary battery, the drive motor, and the power line are arranged between the pair of left and right side members,
the hydrogen tank is arranged on an outer side of the pair of left and right side members in a vehicle width direction, and
the hydrogen pipe is provided above the power line and below the detector in a side view.

* * * * *